US012807514B2

(12) United States Patent
Liu et al.

(10) Patent No.: US 12,807,514 B2
(45) Date of Patent: Nov. 24, 2026

(54) LITHIUM NICKEL MANGANESE OXIDE CORE-SHELL MATERIAL AND MANUFACTURING METHOD THEREOF

(71) Applicant: CPC CORPORATION, TAIWAN, Kaohsiung (TW)

(72) Inventors: Shih-An Liu, Kaohsiung (TW); Jen-Hsien Huang, Kaohsiung (TW); Jui-Hsiung Huang, Kaohsiung (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 536 days.

(21) Appl. No.: 18/367,906

(22) Filed: Sep. 13, 2023

(65) Prior Publication Data

US 2024/0383772 A1 Nov. 21, 2024

(30) Foreign Application Priority Data

May 18, 2023 (TW) ................................ 112118463

(51) Int. Cl.
*C01G 53/54* (2025.01)

(52) U.S. Cl.
CPC .......... *C01G 53/54* (2013.01); *C01P 2004/61* (2013.01); *C01P 2006/40* (2013.01)

(58) Field of Classification Search
CPC ........ C01G 53/54; C01G 53/50; C01G 53/82; C01P 2004/61; C01P 2006/40; Y02E 60/10
See application file for complete search history.

(56) References Cited

U.S. PATENT DOCUMENTS

2008/0193841 A1 * 8/2008 Sun ........................ C01G 53/54 429/231.95

FOREIGN PATENT DOCUMENTS

CN 103794752 A * 5/2014 ............ H01M 4/505

OTHER PUBLICATIONS

Han et al., "Suppressed phase separation in spinel LiNi0.5Mn1.5O4 cathode via interstitial sites modulation" Nano Energy 91, Oct. 2021, total 21 pages. (Year: 2021).*
Sun et al., "High-energy cathode material for long-life and safe lithium batteries" Nature Materials 8, Mar. 2009, 320-324 (Year: 2009).*
Jo et al., "Nanoparticle-Nanorod Core-Shell LiNi0.5Mn1.5O4 Spinel Cathodes with High Energy Density for Li-Ion Batteries" Journal of The Electrochemical Society 157, May 2010, A841-A845 (Year: 2010).*

* cited by examiner

*Primary Examiner* — Richard M Rump
*Assistant Examiner* — Abdul-Rahman Yusuf Waleed Smari
(74) *Attorney, Agent, or Firm* — Maschoff Brennan

(57) ABSTRACT

A lithium nickel manganese oxide core-shell material, comprising a core, composed of a first lithium nickel manganese oxide material; and a shell, covering the core and composed of a second lithium nickel manganese oxide material, wherein the first lithium nickel manganese oxide material and the second lithium nickel manganese oxide material contain manganese and nickel, and the ratio of manganese and nickel in the first lithium nickel manganese oxide material is different from the ratio of manganese and nickel in the second lithium nickel manganese oxide material.

6 Claims, 5 Drawing Sheets

LITHIUM NICKEL MANGANESE OXIDE CORE-SHELL MATERIAL AND MANUFACTURING METHOD THEREOF

FIELD OF THE INVENTION

The present invention relates to a lithium nickel manganese oxide core-shell material and a manufacturing method thereof and more particularly relates to a lithium nickel manganese oxide core-shell material whose core and shell are composed of lithium nickel manganese oxide materials having different ratio of manganese and nickel.

BACKGROUND OF THE INVENTION

Lithium batteries have the advantage of high energy density and have been the mainstream energy storage components for portable electronic devices today. Through appropriate material selection and modification of the lithium battery, the operating voltage and specific capacitance of the lithium battery can be improved, and further the energy density of lithium battery products can be enhanced to effectively apply in energy storage systems and electric vehicles.

Positive electrode materials account for about 40% of the overall cost of lithium batteries. We could say the positive electrode material directly determines the price of lithium batteries and could be regarded as the main factor to affect the performance of lithium batteries in terms of energy density, safety, and cycle life.

However, in consideration of lithium nickel manganese oxide (LNMO) as a positive electrode material for lithium batteries, $Mn^{3+}$in lithium nickel manganese oxide (LNMO) may induce disproportionate reaction to cause manganese dissolution and structural changes in the spinel structure, resulting in a drawback of capacity decay.

SUMMARY OF THE INVENTION

The ideal lithium nickel manganese oxide has the chemical formula $LiNi_{0.5}Mn_{1.5}O_4$, and is mainly a $P4_332$ space group with a spinel structure. However, in the conventional technology, different manufacturing processes may cause $Mn^{3+}$ to present in LNMO. For maintaining electrical neutrality, "oxygen loss" may occurs to form $LiNi0.5Mn1.5O4_{-\delta}$ whose crystal structure is changed to Fd−3m. Accordingly, although the Fd−3m composition is not favorable for structural stability, it gains a better discharge rate performance.

As mentioned above, the presence of $Mn^{3+}$ in LNMO materials effects and affects the electrochemical performance of the materials to thus have both advantages and limitations. Therefore, the inventors of the present invention conceived an idea of adjusting the concentration distribution of $Mn^{3+}$ and $Mn^{4+}$ in the LNMO structure to create a core-shell structured material that possesses the advantages of structural stability and excellent discharge rate performance.

Therefore the objective of present invention is to provide a lithium nickel manganese oxide core-shell material and manufacturing method thereof to address the issues present in the prior art.

In order to overcome the technical problems in prior art, the present invention provides a lithium nickel manganese oxide core-shell material, comprising a core, composed of a first lithium nickel manganese oxide material; and a shell, covering the core and composed of a second lithium nickel manganese oxide material, wherein the first lithium nickel manganese oxide material and the second lithium nickel manganese oxide material contain manganese and nickel, and the ratio of manganese and nickel in the first lithium nickel manganese oxide material is different from the ratio of manganese and nickel in the second lithium nickel manganese oxide material.

In one embodiment of the present invention, the first lithium nickel manganese oxide material is represented by: $LiNi_xMn_yO_4$, wherein x+y=2, x=0.3~0.5, and y=1.5~1.7.

In one embodiment of the present invention, the second lithium nickel manganese oxide material is represented by: $LiNi_xMn_yO_4$, wherein x+y=2, x=0.5~0.7, and y=1.3~1.5.

In one embodiment of the present invention, the first lithium nickel manganese oxide material has a particle size of 5~15 μm.

In one embodiment of the present invention, the second lithium nickel manganese oxide material has a particle size of 3~6 μm.

In one embodiment of the present invention, particle size of the first lithium nickel manganese oxide material has a particle size of 10~12 μm.

In one embodiment of the present invention, the second lithium nickel manganese oxide material has a particle size of 4~5 μm.

The present invention provides a manufacturing method of a lithium nickel manganese oxide core-shell material, comprising: a co-precipitation step of mixing a first metal solution and a second metal solution in a container to obtain a co-precipitation product, centrifugally washing the co-precipitation product with pure water, drying it in oven and then sieving it to obtain a reaction precursor; and a sintering step of adding and mixing a lithium salt to the reaction precursor and then performing a sintering treatment thereon to obtain the lithium nickel manganese oxide core-shell material, wherein the first metal solution and the second metal solution contain manganese and nickel, and the ratio of manganese and nickel in the first metal solution is different from the ratio of manganese and nickel in the second metal solution.

In one embodiment of the present invention, the first metal solution is a metal solution with a molar ratio of nickel to manganese of 1:3~1:5.6, and the second metal solution is a metal solution with a molar ratio of nickel to manganese of 1:1.3~1.8.

In one embodiment of the present invention, in the co-precipitation step, the first metal solution is first added to the container, and then the second metal solution is added.

In one embodiment of the present invention, in the sintering step, the sintering treatment is carried out at a temperature of 500~1000° C. and heating for 1~13 hours.

The present invention relates to a lithium nickel manganese oxide core-shell material, specifically referring to a material with two different nickel-to-manganese ratio components to form the core-shell structure. The present invention also relates to a manufacturing method of a lithium nickel manganese oxide core-shell material, especially a manufacturing method of a lithium nickel manganese oxide core-shell material pelletized through a co-precipitation process. The manufacturing method involves utilizing the variation of nickel and manganese concentrations in the metal solution during co-precipitation to create precursor with varying nickel-manganese ratios and mixing and sintering the precursor with lithium to form the lithium nickel manganese oxide core-shell material. This method effectively enhances the performance of charge rate and discharge rate and maintains cycle life performance. Compared to typical lithium nickel manganese oxide materials ($LiNi_{0.5}Mn_{1.5}O_4$), the lithium nickel manganese oxide core-shell material of present invention replaces nickel in the core portion with manganese, offering a cost advantage due to the relatively higher cost of nickel compared to manganese. In other words, this lithium nickel manganese oxide core-shell material not only improves the discharge capability in different rate and maintains stable discharge capacity during cycling but also further reduces costs.

Figure 4:
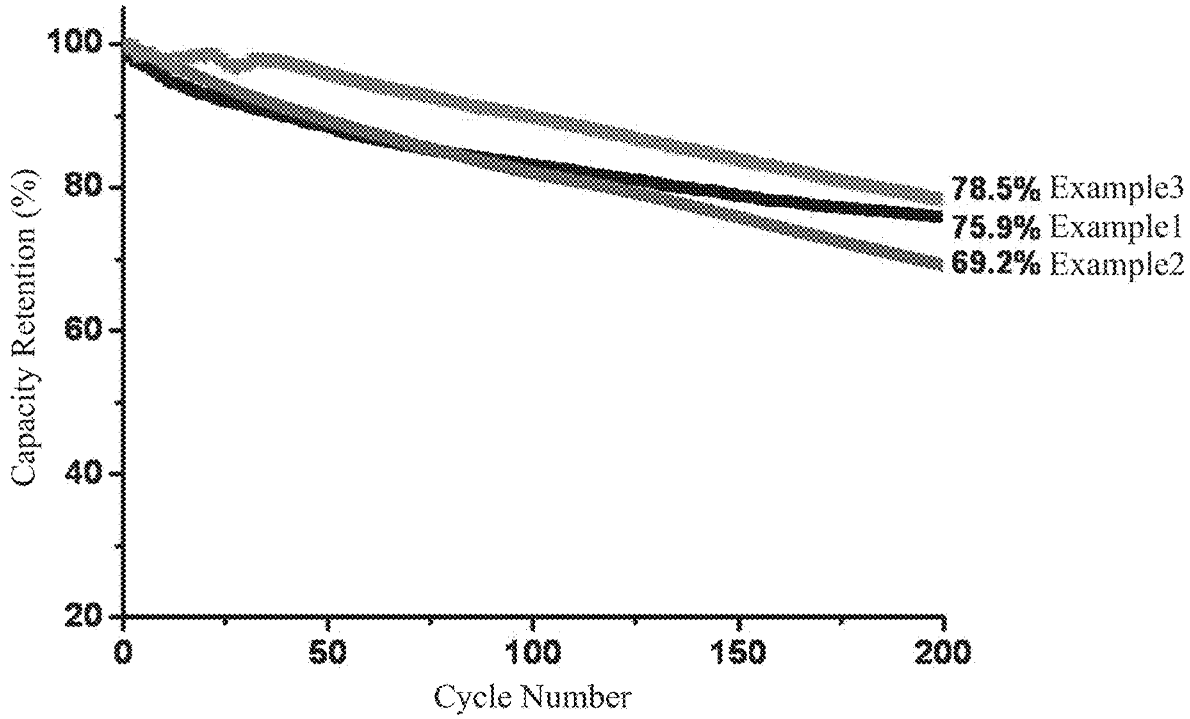

FIC 3 is a drawing illustrating of a curve chart overlaying and comparing all the results of the discharge rate test of the lithium nickel manganese oxide core-shell material according to embodiments of the present invention;

FIG. 4 is a drawing illustrating of a curve chart overlaying and comparing all the results of the cycle test of the lithium nickel manganese oxide core-shell material according to embodiments of the present invention.

DETAILED DESCRIPTION OF THE PREFERRED EMBODIMENTS

Figure 1:
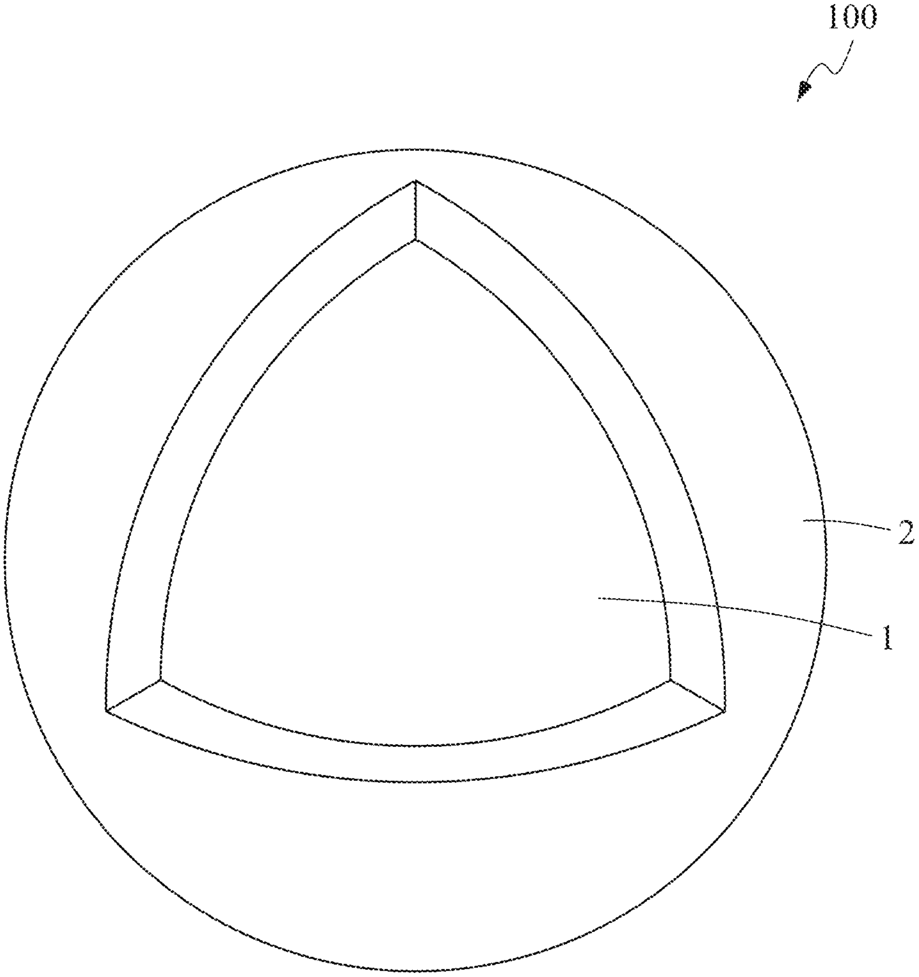
FIG. 1 is a schematic drawing illustrating the structure of the lithium nickel manganese oxide core-shell material according to an embodiment of the present invention.

The preferred embodiments of the present invention are described in detail below with reference to FIG. 1 to FIG. 2*f*. The description is used for explaining the embodiments of the present invention only, but not for limiting the scope of the claims.

According to the lithium nickel manganese oxide core-shell material of the embodiment of the present invention, the lithium nickel manganese oxide core-shell material comprises a core, composed of a first lithium nickel manganese oxide material; and a shell, covering the core and composed of a second lithium nickel manganese oxide material.

The first lithium nickel manganese oxide material and the second lithium nickel manganese oxide material contain manganese and nickel and the ratio of manganese and nickel in the first lithium nickel manganese oxide material is different from the ratio of manganese and nickel in the second lithium nickel manganese oxide material.

According to the lithium nickel manganese oxide core-shell material of the embodiment of the present invention, the first lithium nickel manganese oxide material is represented by: $LiNi_xMn_yO_4$, wherein x+y=2, x=0.3~0.5, and y=1.5~1.7.

According to the lithium nickel manganese oxide core-shell material of the embodiment of the present invention, the second lithium nickel manganese oxide material is represented by: $LiNi_xMn_yO_4$, wherein x+y=2, x=0.5~0.7, and y=1.3~1.5.

According to the lithium nickel manganese oxide core-shell material of the embodiment of the present invention, the first lithium nickel manganese oxide material has a particle size of 5~15 μm.

According to the lithium nickel manganese oxide core-shell material of the embodiment of the present invention, the second lithium nickel manganese oxide material has a particle size of 3~6 μm.

According to the lithium nickel manganese oxide core-shell material of the embodiment of the present invention, particle size of the first lithium nickel manganese oxide material has a particle size of 10~12 μm.

According to the lithium nickel manganese oxide core-shell material of the embodiment of the present invention, the second lithium nickel manganese oxide material has a particle size of 4~5 μm.

The lithium nickel manganese oxide core-shell material with the aforementioned technical features can effectively enhance the performance during charge and discharge in different rate and improve the cycle life performance when used as an electrode in lithium batteries.

According to a manufacturing method of a lithium nickel manganese oxide core-shell material of the embodiment of the present invention, the method comprises a co-precipitation step of mixing a first metal solution and a second metal solution in a container to obtain a co-precipitation product, centrifugally washing the co-precipitation product with pure water, drying it in oven and then sieving it to obtain a reaction precursor; and a sintering step of adding and mixing a lithium salt to the reaction precursor and then performing a sintering treatment thereon to obtain the lithium nickel manganese oxide core-shell material.

The first metal solution and the second metal solution contain manganese and nickel, and the ratio of manganese and nickel in the first metal solution is different from the ratio of manganese and nickel in the second metal solution.

According to a manufacturing method of a lithium nickel manganese oxide core-shell material of the embodiment of the present invention, the first metal solution is a metal solution with a molar ratio of nickel to manganese of 1:3~1:5.6, and the second metal solution is a metal solution with a molar ratio of nickel to manganese of 1:1.3~1.8.

According to a manufacturing method of a lithium nickel manganese oxide core-shell material of the embodiment of the present invention, the first metal solution is first added to the container, and then the second metal solution is added.

According to a manufacturing method of a lithium nickel manganese oxide core-shell material of the embodiment of the present invention, the sintering treatment is carried out at a temperature of 500~1000° C. and heating for 1~13 hours.

Subsequently, based on the following described preparation examples, further detailed explanations about the manufacturing method of the lithium nickel manganese oxide core-shell material of the present invention are provided, but it should be noted that the present invention is not limited to these examples.

Example 1

Nickel sulfate ($NiSO_4 \cdot 6H_2O$), manganese sulfate ($MnSO_4 \cdot H_2O$) and ammonium sulfate ($(NH_4OH)\ SO_4$) are formulated as the feed metal solution in a molar ratio of 1:3:1, and 18% ammonia solution is prepared as chelating agent, 1.2 M sodium hydroxide solution as precipitating agent. A 2-liter glass reactor is prepared as a co-precipitation tank, and diluted ammonia solution is used as the starting solution. The feed metal solution and chelating agent are injected into the glass reactor by a peristaltic pump, and the feed flow rate is 40 ml/hour and 20 ml/hour respectively for the co-precipitation step, during which the pH value is set at 10.2±0.1 by a pH controller, when the pH value deviates from the set value, the precipitant is added by the dosing pump to maintain the reaction environment. The reactor temperature is set to 40° C., the mixer speed is set to 200 rpm, and nitrogen is used as a protective atmosphere. When the solution is full to the overflow port, it is guided to the overflow tank through the plastic conduit to collect the co-precipitated product. Finally, the precipitate is centrifuged and washed with pure water, dried in an oven at 80° C., and then sieved to obtain the reaction precursor. The reaction precursor then added to lithium carbonate (or lithium hydroxide) and zirconium balls, mixed with a 3D mixer for 16 hours, and the mixed powder is sintered in a tube furnace. In an air atmosphere, from room temperature to 710° C. at a heating rate of 1° C./min, the temperature is maintained for 12 hours, then dropped to 600° C., maintained for 12 hours, then cooled to room temperature, and sieved to obtain the prototype material of lithium nickel manganese.

Example 2

(The lithium nickel manganese oxide core-shell material with core of $LiNi_{0.3}Mn_{1.7}O_4$ and shell of $LiNi_{0.7}Mn_{1.3}O_4$) According to the method of Example 1, when preparing the feed metal solution, the first metal solution is formed by nickel sulfate ($NiSO_4 \cdot 6H_2O$), manganese sulfate ($MnSO_4 \cdot H_2O$) and ammonium sulfate ($(NH_4OH)\ SO_4$) with a molar ratio of 0.3:1.7:1, the second metal solution is formed by nickel sulfate ($NiSO_4 \cdot 6H_2O$), manganese sulfate ($MnSO_4 \cdot H_2O$) and ammonium sulfate ($(NH_4OH)\ SO_4$) with a molar ratio of 0.7:1.3:1. The first metal solution is added to the container first, then the second metal solution is added in the co-precipitation step to form the lithium nickel manganese oxide core-shell material of Example 2.

Example 3

(The lithium nickel manganese oxide core-shell material with core of $LiNi_{0.3}Mn_{1.7}O_4$ and shell of $LiNi_{0.5}Mn_{1.5})_4$) According to the method of Example 1, when preparing the feed metal solution, the first metal solution is formed by nickel sulfate ($NiSO_4 \cdot 6H_2O$), manganese sulfate ($MnSO_4 \cdot H_2O$) and ammonium sulfate ($(NH_4OH)\ SO_4$) with a molar ratio of 0.3:1.7:1, the second metal solution is formed by nickel sulfate ($NiSO_4 \cdot 6H_2O$), manganese sulfate ($MnSO_4 \cdot H_2O$) and ammonium sulfate ($(NH_4OH)\ SO_4$) with a molar ratio of 0.5:1.5:1. The first metal solution is added to the container first, then the second metal solution is added in the co-precipitation step to form the lithium nickel manganese oxide core-shell material of Example 3.

Elemental Analysis

In order to comprehensively understand the properties of the formed lithium nickel manganese oxide core-shell material, the lithium nickel manganese oxide core-shell materials obtained from Examples 1 and 2 are analyzed using an inductively coupled plasma optical emission spectrometer (ICP-OES). The analysis results are shown in Table 1.

TABLE 1

| Sample | Mn(%) | Ni(%) | Mn/Ni mole ratio |
|---|---|---|---|
| Example 1 | 40.6 | 14.5 | 2.9 |
| Example 2 | 40.5 | 14.8 | 2.9 |

Electrical Performance Testing

In order to understand the effect on the charge and discharge performance of the battery when the lithium nickel manganese oxide core-shell material of the present invention is applied to the battery, the battery is prepared according to the following method, and the charge and discharge test is carried out.

Figure 2A:
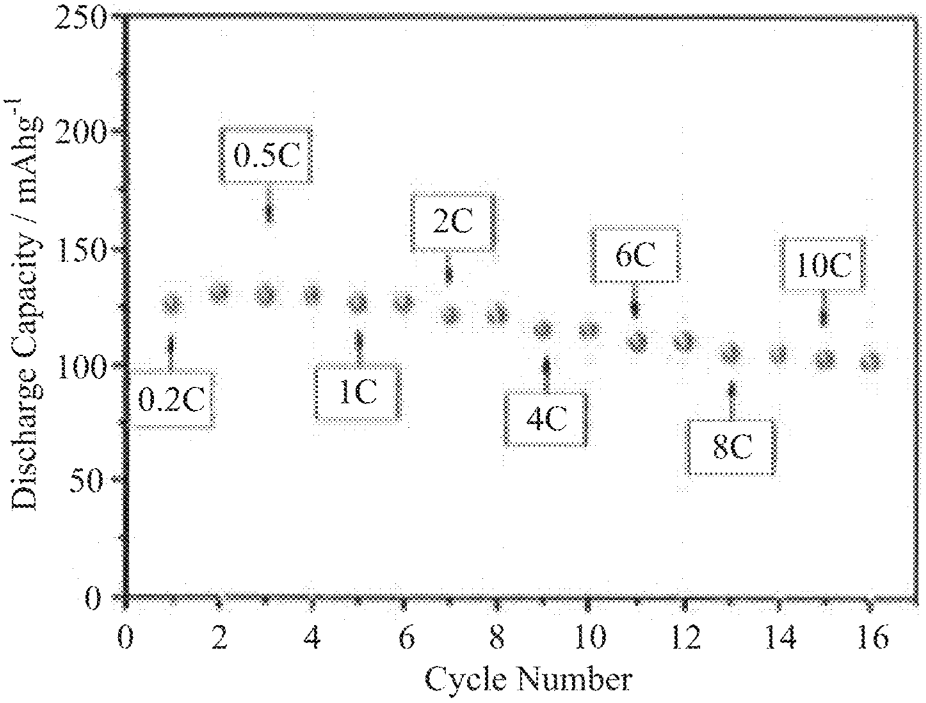
FIG. 2*a* is a schematic drawing illustrating the results of the discharge rate test of the lithium nickel manganese oxide core-shell material according to the embodiment of the present invention.
Figure 2B:
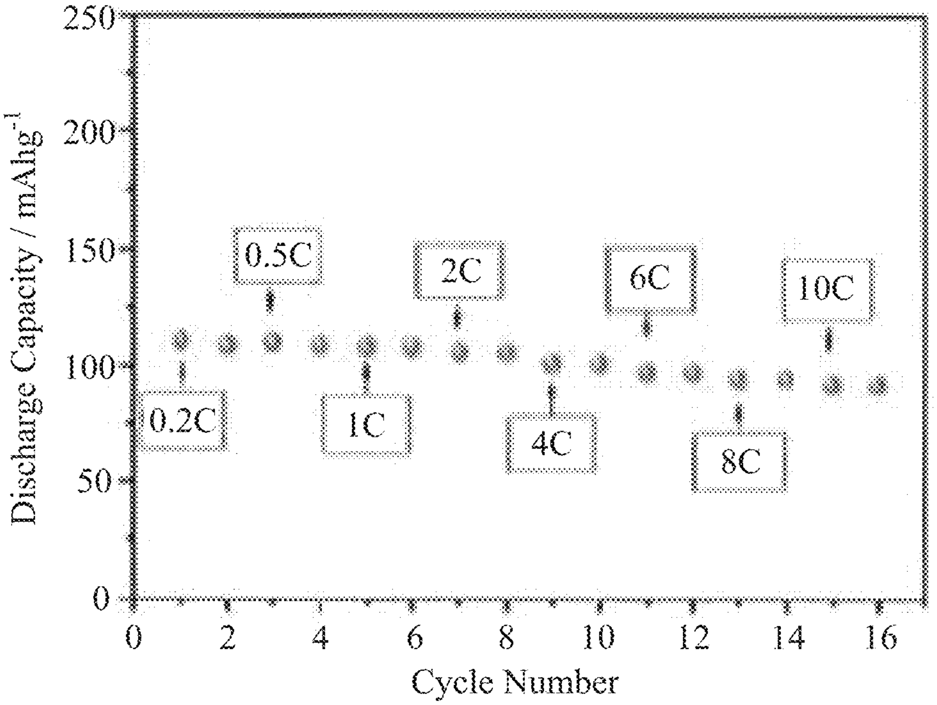
FIG. 2*b* is a schematic drawing illustrating the results of the discharge rate test of the lithium nickel manganese oxide core-shell material according to another embodiment of the present invention.
Figure 2C:
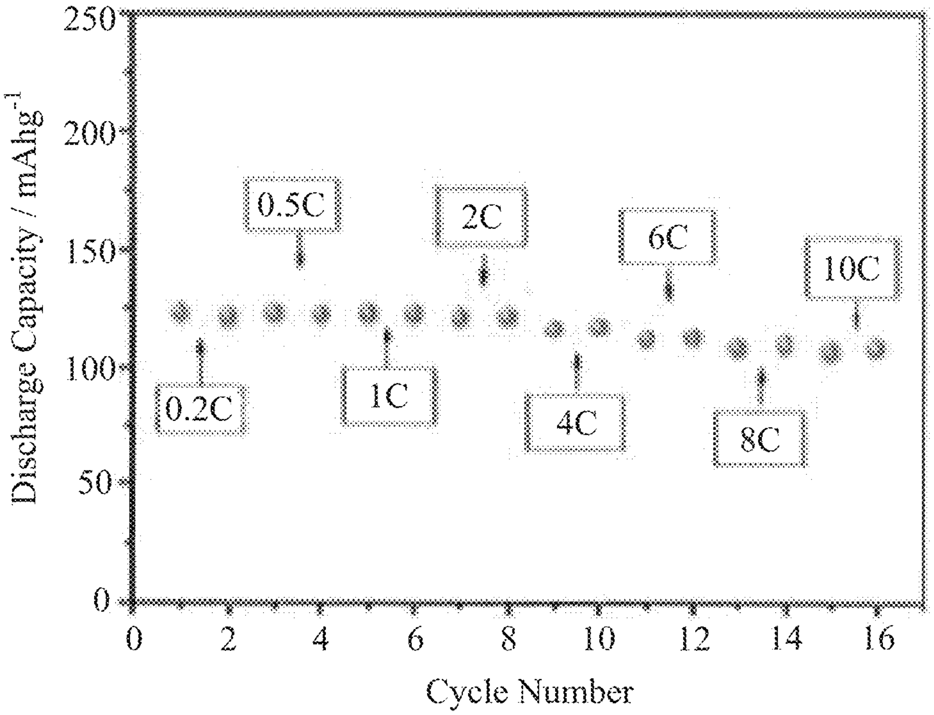
FIG. 2*c* is a schematic drawing illustrating the results of the discharge rate test of the lithium nickel manganese oxide core-shell material according to another embodiment of the present invention.
Figure 2D:
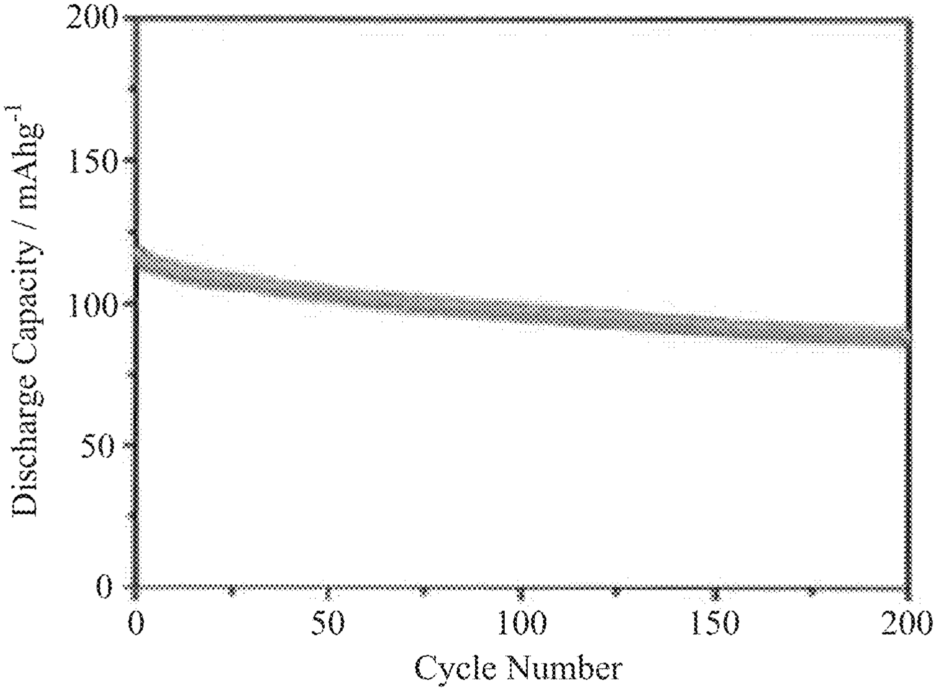
FIG. 2*d* is a curve chart illustrating the results of the cycle test of the lithium nickel manganese oxide core-shell material in one embodiment of the present invention.
Figure 2E:
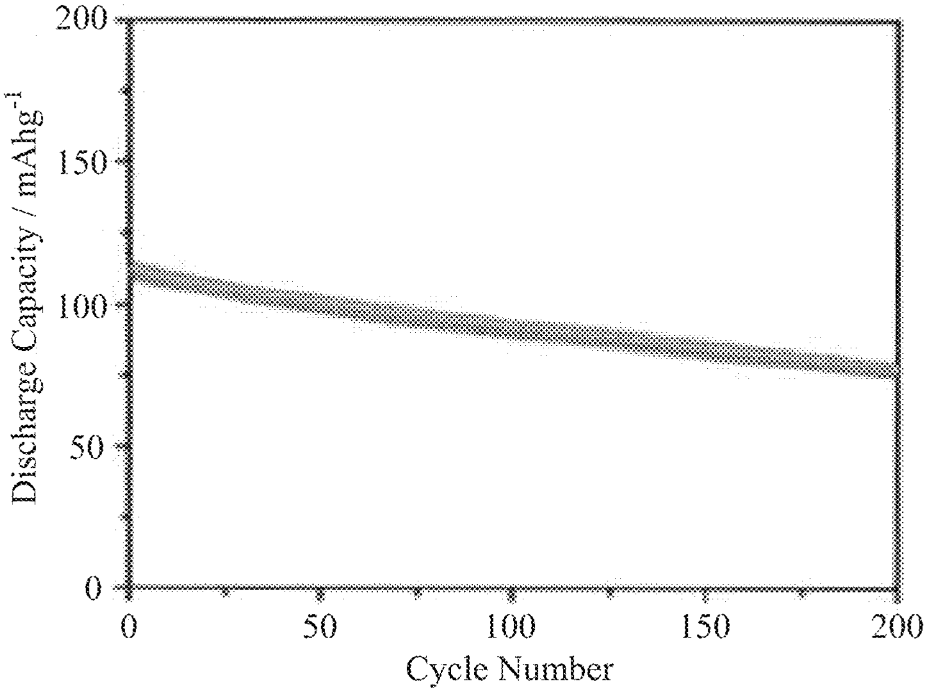
FIG. 2*e* is a curve chart illustrating the results of the cycle test of the lithium nickel manganese oxide core-shell material in another embodiment of the present invention.

First, 1.5 g of polyvinylidene fluoride (Polyvinylidene fluoride) is added to 24.75 g of N-methylpyrrolidone (N-Methylpyrrolidone, NMP) and mixed, after polyvinylidene fluoride is completely dissolved, 12 g of the lithium nickel manganese oxide core-shell material of Example 1 to 3 and 1.5 g of conductive carbon material are added and fully mixed, then the slurry is coated on an 18-micron aluminum foil with a 120-micron doctor blade, and then the aluminum foil is baked in an oven at 120° C. to complete the preparation of the battery electrode, wherein the active material is a conductive carbon material, and the weight ratio of the adhesive is 80:10:10. Before assembling the battery, first the electrode is baked in a vacuum environment at 120° C. for 12 hours, then the electrode is putted into the glove box, using lithium metal as the counter electrode, and the electrolyte is 1 M LiPF6 with ethylene carbonate (EC) and diethyl carbonate (DEC), in which ethylene carbonate and diethyl carbonate were mixed at a volume ratio of 1:1, button-type half-cell is assembled with lithium metal, separator, electrolyte and electrode and the subsequent electrical test the carried out. The results were shown in FIGS. 2*a* to 2*f*. FIGS. 2*a* to 2*c* were the batteries made of the materials of Examples 1 to 3 which discharged in rate of 0.2 C, 0.5 C, 1 C, 2 C, 4 C, 6 C, 8 C, and 10 C, and the results of the discharge capacity were measured. FIGS. 2*d* to 2*f* were respectively the batteries with electrode made of the materials of Examples 1 to 3 and discharged 200 cycles and measure the discharge capacity of each cycle.

Figure 3:
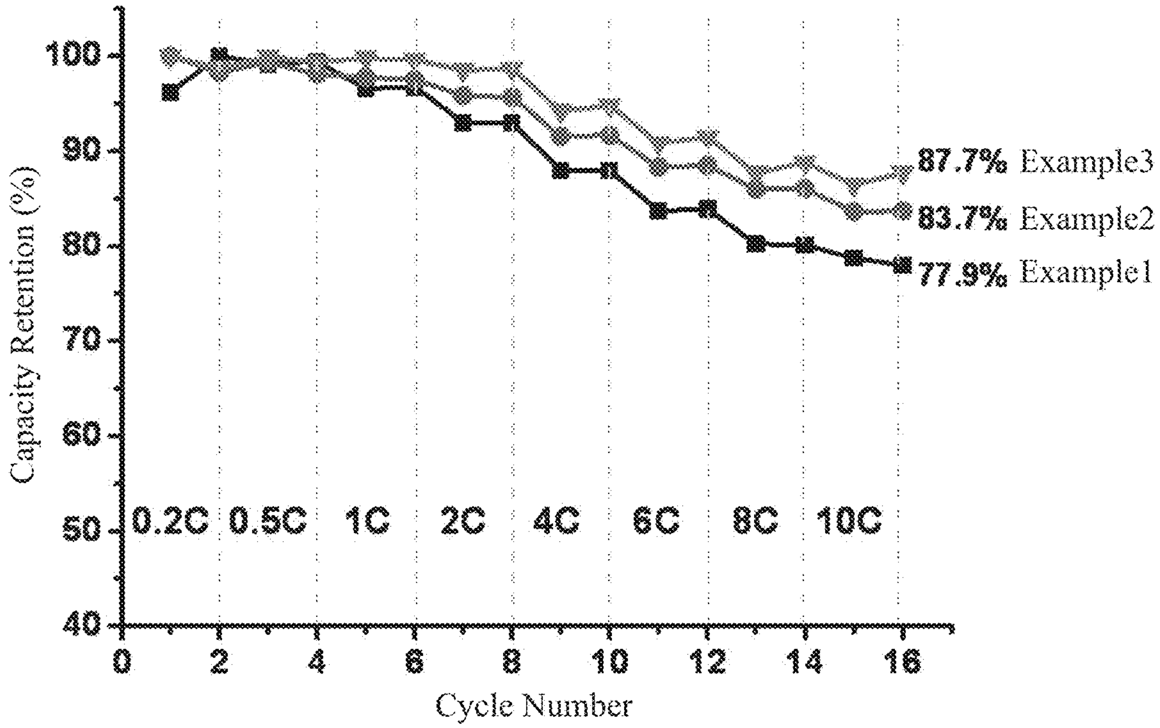

As shown in FIGS. 2*a* to 2*c* and FIG. 3, where FIG. 2*a* illustrates results of the discharge rate test of the lithium nickel manganese oxide core-shell material prepared in Example 1, FIG. 2*b* illustrates results of the discharge rate test of the lithium nickel manganese oxide core-shell material prepared in Example 2, and FIG. 2*c* illustrates results of the discharge rate test of the lithium nickel manganese oxide core-shell material prepared in Example 3. FIG. 3 shows the overlaid line chart of all discharge rate test results of the lithium nickel manganese oxide core-shell material in embodiments of the present invention. From the results shown in the FIGS, it can be observed that the lithium nickel manganese oxide core-shell material prepared according to the manufacturing method of the present invention shows that Examples 2 and 3 exhibits superior discharge capacity variations performance than that of Example 1 even at a high discharge rate of 10 C when tested in lithium batteries, indicating that the lithium nickel manganese oxide core-shell material prepared by the manufacturing method of the present invention is superior to unmodified materials.

Figure 2F:
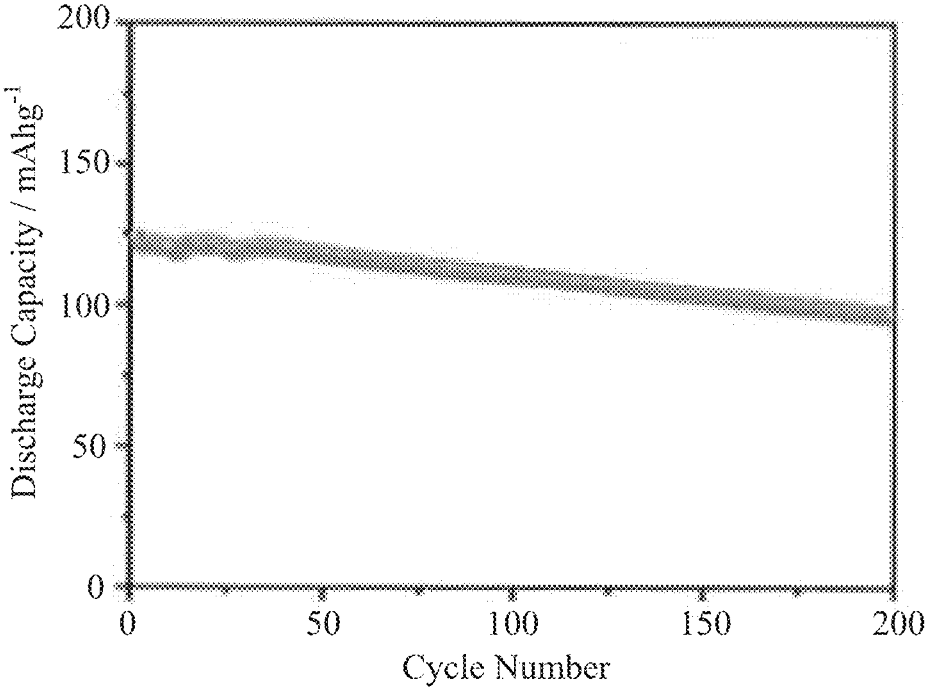
FIG. 2*f* is a curve chart illustrating the results of the cycle test of the lithium nickel manganese oxide core-shell material in another embodiment of the present invention.

As shown in FIGS. 2*d* to 2*f* and FIG. 4, where FIG. 2*d* illustrates the results of the cycle test of the lithium nickel manganese oxide core-shell material prepared in Example 1, FIG. 2*e* illustrates the results of the cycle test of the lithium nickel manganese oxide core-shell material prepared in Example 2, and FIG. 2*f* illustrates the results of the cycle test of the lithium nickel manganese oxide core-shell material prepared in Example 3. FIG. 4 shows the overlaid curve chart of all cyclic test results of the lithium nickel manganese oxide core-shell material in embodiments of the present invention. From the results shown in the figures, it can be observed that the lithium nickel manganese oxide core-shell material prepared according to the manufacturing method of the present invention maintains stable cyclic structure even after undergoing a high cycle number of 200 cycles of discharge when tested in lithium batteries. The discharge capacity variations of Examples 2 and 3 are not inferior to that of Example 1, indicating that the lithium nickel manganese oxide core-shell material prepared by the manufacturing method of the present invention, as well as unmodified materials, can still maintain stable cyclic structure.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A lithium nickel manganese oxide core-shell material, comprising:

a core, composed of a first lithium nickel manganese oxide material; and a shell, covering the core and composed of a second lithium nickel manganese oxide material, wherein the first lithium nickel manganese oxide material and the second lithium nickel manganese oxide material contain manganese and nickel, and the ratio of manganese and nickel in the first lithium nickel manganese oxide material is different from the ratio of manganese and nickel in the second lithium nickel manganese oxide material, the second lithium nickel manganese oxide material is represented by: $LiNi_xMn_yO_4$, wherein $x+y=2$, $0.5<x\leq0.7$, and $1.3\leq y<1.5$.

2. The lithium nickel manganese oxide core-shell material as claimed in claim 1, wherein the first lithium nickel manganese oxide material is represented by: $LiNi_xMn_yO_4$, wherein $x+y=2$, $x=0.3\sim0.5$, and $y=1.5\sim1.7$.

3. The lithium nickel manganese oxide core-shell material as claimed in claim 1, wherein the first lithium nickel manganese oxide material has a particle size of 5~15 μm.

4. The lithium nickel manganese oxide core-shell material as claimed in claim 1, wherein the second lithium nickel manganese oxide material has a particle size of 3~6 μm.

5. The lithium nickel manganese oxide core-shell material as claimed in claim 3, wherein the first lithium nickel manganese oxide material has a particle size of 10~12 μm.

6. The lithium nickel manganese oxide core-shell material as claimed in claim 4, wherein the second lithium nickel manganese oxide material has a particle size of 4~5 μm.

* * * * *